Sheet 1 - 2 Sheets.
L. Miller.
Mower.
No 770
Reissued Jul. 19, 1859.
Fig. 1.
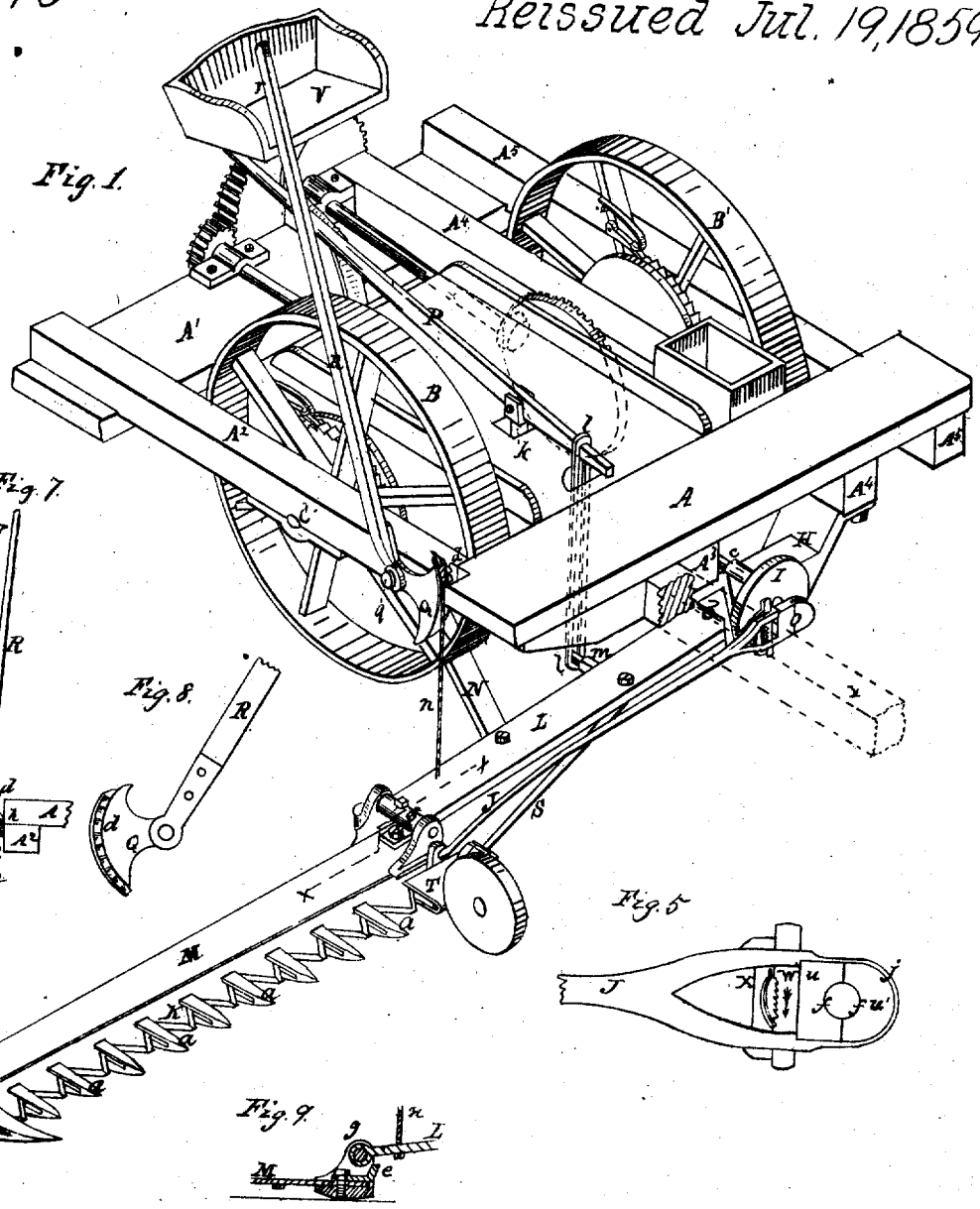
Fig. 6.
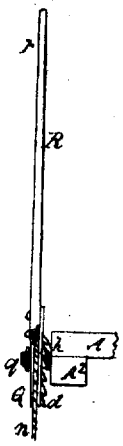
Fig. 7.
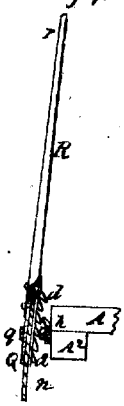
Fig. 8.
Fig. 5
Fig. 9.

Sheet 2 - 2 Sheets.
L. Miller.
Mower.
No. 770
Reissued Jul. 19, 1859
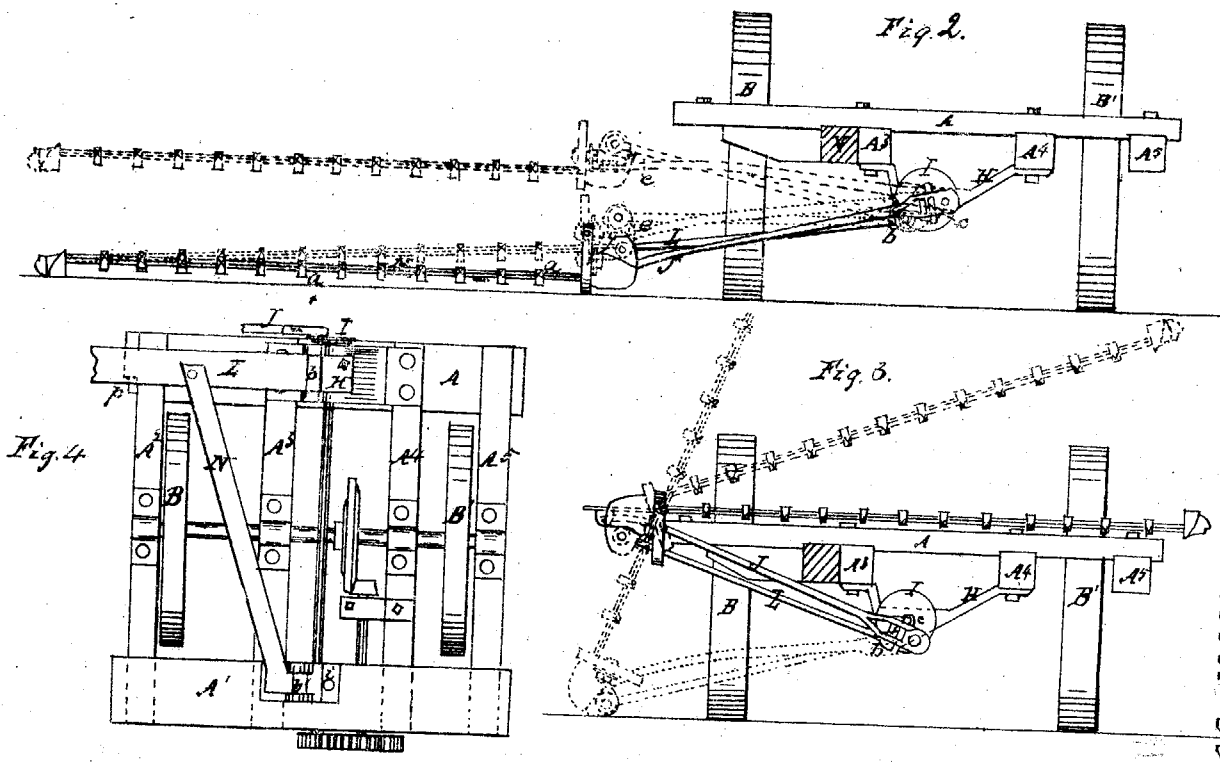

UNITED STATES PATENT OFFICE.

LEWIS MILLER, OF CANTON, OHIO, ASSIGNOR TO C. AULTMAN & CO.

IMPROVEMENT IN HARVESTERS.

Specification forming part of Letters Patent No. 20,180, dated May 4, 1858; Reissue No. 770, dated July 19, 1859.

DIVISION H.

*To all whom it may concern:*

Be it known that I, LEWIS MILLER, of Canton, in the county of Stark and State of Ohio, have invented certain new and useful Improvements in Machines for Harvesting Grain and Grass, of which the following is a full, clear, and exact description, reference being had to the accompanying drawings, which make part of this specification, and in which—

Figure 1 represents a view in perspective of the machine as arranged for mowing. Fig. 2 represents a front elevation of the machine, the black lines showing the finger-beam resting upon the ground in the position it will occupy when the machine is mowing on a level surface, the red lines showing the position of the finger-beam when mowing on an uneven surface, with its left end raised to conform thereto, and the blue lines showing the finger-beam raised off and held parallel to the ground by means of a hand-lever to pass over an obstacle. Fig. 3 represents by the black lines a front elevation of the machine with the finger-beam folded over upon the frame in a compact manner. The red lines show the finger-beam raised on end preparatory to being lifted by the hand-lever and turned over upon the frame, and the blue lines show the finger-beam almost raised up and turned over upon the frame. Fig. 4 represents a view of the under side of the main frame and certain parts connected therewith, but showing more particularly the arrangement of the brace for supporting the coupling-arm. Fig. 5 represents on an enlarged scale a view of one side of a portion of the connecting-rod which transmits motion from the crank to the cutter. Fig. 6 represents a front view of the quadrant-lever for lifting and the ratchet-teeth and detent for holding up the finger-beam when raised; also, a fragment of the adjacent part of the frame detached from the machine. Fig. 7 represents a similar view of the same parts, the quadrant-lever and its ratchet-teeth being in the position they occupy when turned aside to disengage the teeth from the detent preparatory to raising or lowering the finger-beam; and Fig. 8 represents a view of the side of the quadrant having the ratchet-teeth thereon. Fig. 9 represents a vertical section at the line *x x* of Fig. 1, showing the knuckle of the joint connecting the finger-beam and coupling-arm.

That side of the machine on which the finger-beam projects when on the ground in the position shown in Fig. 1, I call the "right" side. The other I call the "left" side.

In mowing-machines it is found to be necessary to work the cutter very rapidly in order to cut grass clean under all circumstances, and such rapid motion of alternating parts which have great weight and momentum—like the connecting-rod and cutter—renders it necessary, for the preservation of the machine from rapid destruction by concussion, that the wrist-pin of the crank should fit closely in its bearing in the brasses in the end of the connecting-rod.

Various devices are known for keeping the brasses in close contact with the wrist of a crank, the best of which is the gib, key, and strap for holding the brasses and tightening them from time to time upon the wrist. The rapid motion, combined with the jarring of the machine, is, however, apt to work the key loose, and thereby cause greater trouble and danger than is avoided by this device, and the necessary cheapness of construction, lightness, and facility for taking apart the connecting-rod in a mowing-machine forbids the employment of a screw-key, such as is sometimes employed in steam-engines.

To construct a gib, key, and strap fastening and adjustment for the brasses of the connecting-rod adapted to a mowing-machine is the object of the invention claimed under this patent, which consists in combining with the ordinary gib and key a series of teeth and a spring-pawl, the teeth being on the key and the pawl on the gib, which is deemed the best; but this arrangement may be reversed; or the pawl or the notches may be on the brasses or on some fixed part of the connecting-rod or on the strap, and so arranged that when the key is driven in the pawl will catch in the teeth and prevent it from working back, becoming loose, or falling out, thus avoiding many difficulties, heretofore deemed unavoidable and without remedy, in the working of the cutting apparatus of mowing-machines.

In the accompanying drawings, Fig. 5 represents one end of a connecting-rod, J, having brasses *u* and *u'*, with a bearing, *f*, between them for the wrist of the crank. These brasses are fitted into a strap, *j*, made in one piece with and connecting the bifurcated end of the connecting-rod. A gib, X, and a key, W, are fitted with a mortise through the end of the connecting-rod, and are placed in relation to the brasses in the usual manner, so that if the key be driven in the direction of the arrow upon it the brasses will be pressed together and tightened upon the wrist.

In the edge of the key next the gib a series of ratchet-teeth are made, and in the adjacent edge of the gib a recess is formed to receive a spring-pawl or dog, *v*, which tends at all times to press its end into the ratchet-teeth to hold the wedge at the point to which it may be driven. By simply pressing the pawl out of the ratchet-teeth the wedge can at any time be driven back and withdrawn as easily as a common wedge merely held by friction.

What I claim under this patent as my invention is—

The combination of the spring-pawl and the teeth with the gib and key of the connecting-rod, the connecting-rod, and cutter, substantially as herein set forth.

In testimony whereof I have hereunto subscribed my name.

LEWIS MILLER.

Witnesses:
S. HAWKES,
JAS. S. TONNER.